J. C. DENNEY:
METHOD OF TREATING VEGETABLE IVORY NUTS.
APPLICATION FILED JAN. 9, 1912.
1,053,162.
Patented Feb. 18, 1913.
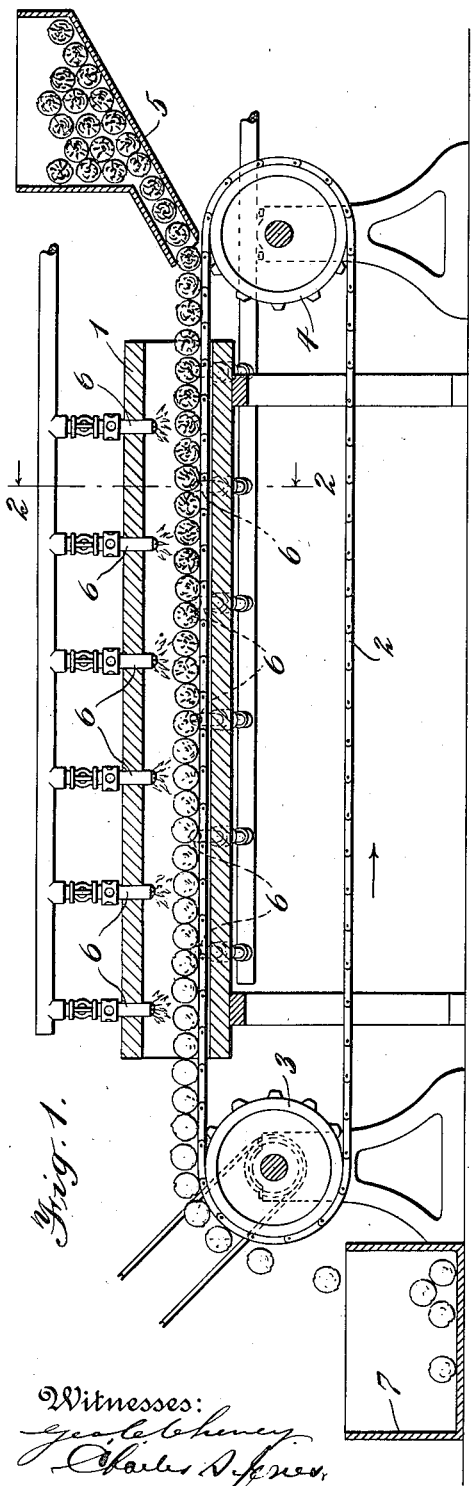
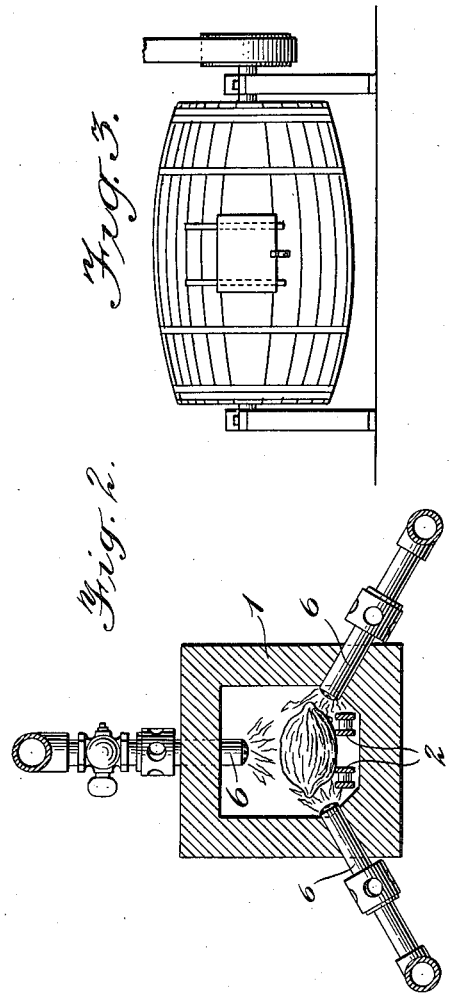
Witnesses:
Inventor
John C. Denney
By his Attorneys

UNITED STATES PATENT OFFICE.

JOHN C. DENNEY, OF POUGHKEEPSIE, NEW YORK, ASSIGNOR TO SENECA BUTTON COMPANY, OF POUGHKEEPSIE, NEW YORK, A CORPORATION OF NEW YORK.

METHOD OF TREATING VEGETABLE-IVORY NUTS.

1,053,162.  Specification of Letters Patent.  Patented Feb. 18, 1913.

Application filed January 9, 1912. Serial No. 670,180.

*To all whom it may concern:*

Be it known that I, JOHN C. DENNEY, a citizen of the United States, residing at Poughkeepsie, in the county of Dutchess, State of New York, have invented certain new and useful Improvements in Methods of Treating Vegetable-Ivory Nuts, of which the following is a specification.

The dry and hardened kernel of the corozo nut, known as vegetable ivory from its resemblance to natural ivory, has been extensively used for many years in the manufacture of buttons. These ivory nuts are grown principally in South America. They grow four or five in a cluster with four or five clusters in a bur, each nut, when ripe having a thin and very hard shell which must be removed. The only method heretofore in use, so far as known to me, has been by drying the nut and then subjecting the dried nuts to the action of a tumbling barrel, and the greatest problem with which manufacturers have to deal is to dry the nuts in such manner that the waste because of cracking of the kernel, due to its unequal contraction during drying, will be reduced to a minimum. If dried too rapidly the kernel will crack so that the block from which the buttons are cut, known as a "slab", is suitable only for buttons of relatively small size. Various methods of drying have been practised, among them being drying in steam heated rooms; hot air kilns; or by spreading in thin layers and blowing air at atmospheric temperature over them. The last named method is that preferred as it gives a more natural drying than the others. All these prior methods are, however, relatively expensive as they require the keeping on hand of a large stock of nuts, extensive space for drying, and the time required varies from two to eight weeks. In the center of the nut is a small pocket filled with fluid. This pocket dries out or hardens with age and in the drying of the nuts by natural or artificial means the kernel contracts unequally around this pocket causing the kernel to crack and even with the most approved methods, the unequal contraction of the kernel causes it to crack to such an extent as to materially add to the cost of the manufactured articles because of the waste, and furthermore makes it practically impossible to obtain a sufficient supply of sound kernels to fill the demand for buttons of large size. Moreover present methods do not give uniform drying results. After drying, by these previous methods, the nuts are placed in a tumbling barrel and tumbled from twenty minutes to an hour during which operation the shells are cracked and release the kernels.

The present invention involves a complete departure from prior methods and is designed to effect the removal of the shell in a few seconds of time, and with the highly advantageous result of doing so with practically no physical change in the kernel, so that the latter is obtained in its whole and natural condition without shrinkage and therefore without the faults incident to the drying method of removing the shell. This result is accomplished by subjecting the nuts to the action of heat of such temperature, in the presence of oxygen, as to completely or partially burn the shell from the kernel. Any convenient form of furnace may be employed for the purpose, one form being shown in the accompanying drawings in which—

Figure 1 is a central longitudinal section, Fig. 2 the transverse section on the plane of the line 2—2 of Fig. 1, and Fig. 3, a view of a tumbling barrel which may be employed for removal of the charred shells.

The furnace shown by me comprises a rectangular chamber 1 mounted upon suitable supports and open to the atmosphere at both ends. For the purpose of conveying the nuts through the furnace I provide an endless chain or belt 2 of convenient construction which is adapted to pass around sprocket wheels 3 and 4. Sprocket wheel 3 is driven by any suitable power. The nuts are delivered to the chain carrier from a hopper 5 and as they pass through the furnace are subjected to the action of the heat therein produced by oil or gas burners 6. The burners may be so placed that the flames therefrom impinge upon the shells of the nuts if desired. The furnace being open at both ends an abundant supply of oxygen is admitted for the combustion of the shell. The nuts upon leaving the furnace drop into a suitable receptacle 7. The temperature and the time of passage of the nuts through the furnace are so regulated as to effect the burning off of the shells without charring the kernels, and to prevent the heat penetrating the kernels to any appreciable extent. In practice, I have used a temperature varying from 800 to 1200° F., the time varying from ten to twenty seconds. The temperature and the time, however, may be readily determined according to the size and condition of the nuts. After the removal of the shells, the green kernels are cut or sawed into slabs and the slabs dried. They are then used for the manufacture of buttons in a well-known manner.

Although the ideal condition would be to remove the shell by burning it off completely, it is not possible, under ordinary working conditions to effect the desired result on all of the nuts, even when the temperature and the volume of oxygen are so regulated with that end in view. If any portion of the shell remains on a kernel after the nut passes through the furnace it is so charred that it may be removed by hand or by the action of a tumbling barrel. In Fig. 3 I have shown a form of tumbling barrel which may be employed. This, as usual, is mounted in suitable bearings and rotated so that the abrasion of the nuts, one upon the other will effect the removal of any portion of the shell which is not completely burned off in the furnace. By burning off the shells, it is my intention to include either complete or partial removal by the method described. This is, it is my intention to include charring as well as complete combustion of the shells. The temperature and the volume of air may be so regulated as not to effect complete combustion of the entire shell but to char the shells so that they may be removed by the action of a tumbling barrel, or in any other suitable manner. By either method, that is by complete or partial combustion of the shell, the kernel is not materially affected by the heat and I am enabled to obtain it in its natural condition from which green slabs may be sawed with a minimum of waste and at a great increase in the proportion of slabs for buttons of large size.

Under the old drying method the larger factories carried on hand many thousands of dollars worth of raw material at all times, this being necessary on account of the crackage of the nuts by that method. The present method effects a saving of at least 50 per cent. in the amount of raw material required to be carried on hand, and in the space necessary for storage. But most important of all is the saving due to the lessening of crackage and the ability to obtain sound kernels of large size. Another distinct advantage is that the kernels may be sawed into slabs when in a green condition. In fact I regard the ability to do so as one of the most important incidents to the new method of treatment as by it the slabs may be dried naturally by spreading them upon trays kept in a room at the temperature of the atmosphere, giving a uniform drying so that a finer grain is obtained than can be obtained by previous methods. That is, I am enabled to dry the raw material for the buttons in the form of slabs instead of drying the kernel as a whole as heretofore.

What I claim and desire to secure by Letters Patent of the United States, is;—

1. The method of treating vegetable ivory nuts consisting in subjecting them to the application of heat to affect the shell only for removing the same from the kernel.

2. The method of treating vegetable ivory nuts consisting in subjecting them to heat, in the presence of oxygen, sufficient to char or burn off the shells.

3. The method of treating vegetable ivory nuts consisting in subjecting them to heat for about ten to twenty seconds, in the presence of oxygen, to char or burn off the shells.

4. The method of treating vegetable ivory nuts consisting in subjecting them to the heat of a furnace varying between 800 and 1200° F., in the presence of oxygen sufficient to char or burn off the shells.

5. The method of treating vegetable ivory nuts consisting in subjecting them to heat in the presence of oxygen sufficient to char or burn off the shells, and tumbling the nuts to remove any portions of the shells which may remain attached to the kernels.

In testimony whereof I have hereunto signed my name in the presence of two subscribing witnesses.

JOHN C. DENNEY.

Witnesses:
   Geo. V. L. Spratt,
   A. S. Garland.